United States Patent [19]
Pritchard et al.

[11] Patent Number: 5,622,402
[45] Date of Patent: Apr. 22, 1997

[54] PANEL WITH INTEGRAL ENERGY ABSORBER AND AIR DUCT

[75] Inventors: James R. Pritchard, Somersworth, N.H.; Mary K. Marshall, York, Me.; Brian R. Hatter, Highland, Mich.; Wayne D. LaRoche, Farmington, N.H.

[73] Assignee: Davidson Textron Inc., Dover, N.H.

[21] Appl. No.: 703,836

[22] Filed: Aug. 27, 1996

Related U.S. Application Data

[63] Continuation of Ser. No. 424,183, Apr. 19, 1995, abandoned.

[51] Int. Cl.$^6$ ............................. B62D 25/14; B50H 1/26; B60R 21/045
[52] U.S. Cl. .......................... 296/191; 296/208; 280/752; 454/69
[58] Field of Search ................ 180/90; 280/751, 280/752, 753; 296/70, 71, 72, 73, 74, 191, 192, 208; 454/69, 124, 143

[56] References Cited

U.S. PATENT DOCUMENTS

| | | |
|---|---|---|
| 3,042,137 | 7/1962 | Mathues et al. ............... 180/90 |
| 3,912,036 | 10/1975 | Davis et al. ............... 180/90 |
| 3,922,429 | 11/1975 | Welch et al. ............... 428/308.4 |
| 4,032,175 | 6/1977 | Aibe et al. ............... 280/751 |
| 4,759,568 | 7/1988 | Paefgen et al. ............... 280/732 |
| 4,993,774 | 2/1991 | Greenhalgh et al. ............... 296/208 X |
| 5,076,632 | 12/1991 | Surratt ............... 296/96.21 |
| 5,089,191 | 2/1992 | Hughes ............... 264/46.5 |

*Primary Examiner*—Andrew C. Pike
*Attorney, Agent, or Firm*—Reising, Ethington, Barnard & Perry

[57] ABSTRACT

An interior energy absorbing panel for the passenger compartment of a motor vehicle has a thermoplastic skin, a thermoplastic retainer, a thermoplastic air duct, and an energy absorbing rigid polyurethane foam core which is reaction injection molded about the air duct and to the skin and retainer without requiring any added adhesive. When the skin is of the soft type, a layer of semirigid polyurethane foam is reaction injection molded between the skin and the energy absorbing foam core to impart a soft feel to the skin and protect the energy absorbing foam core from indentation during normal use.

5 Claims, 5 Drawing Sheets

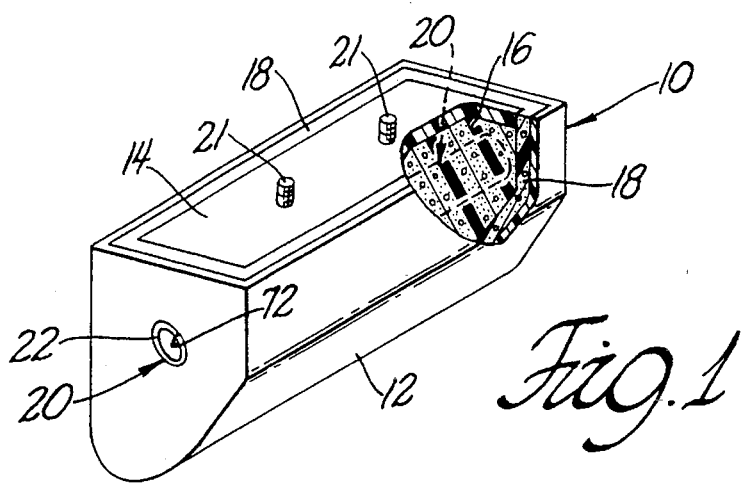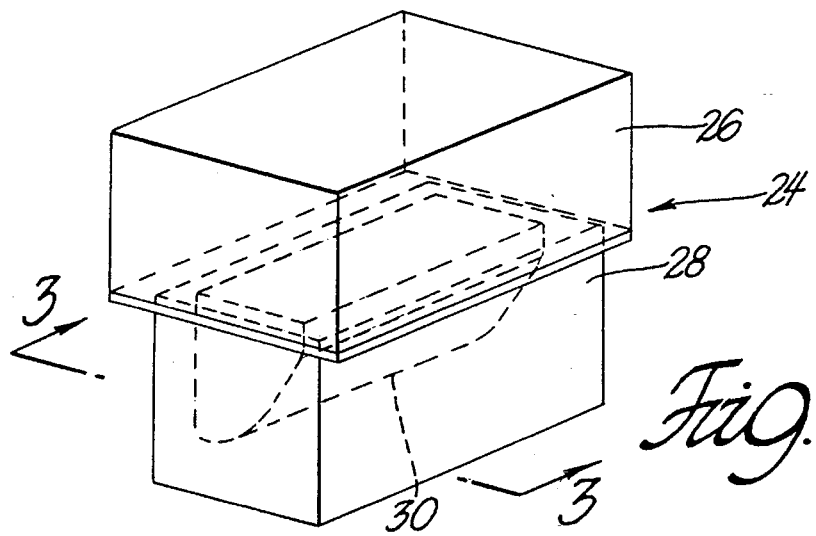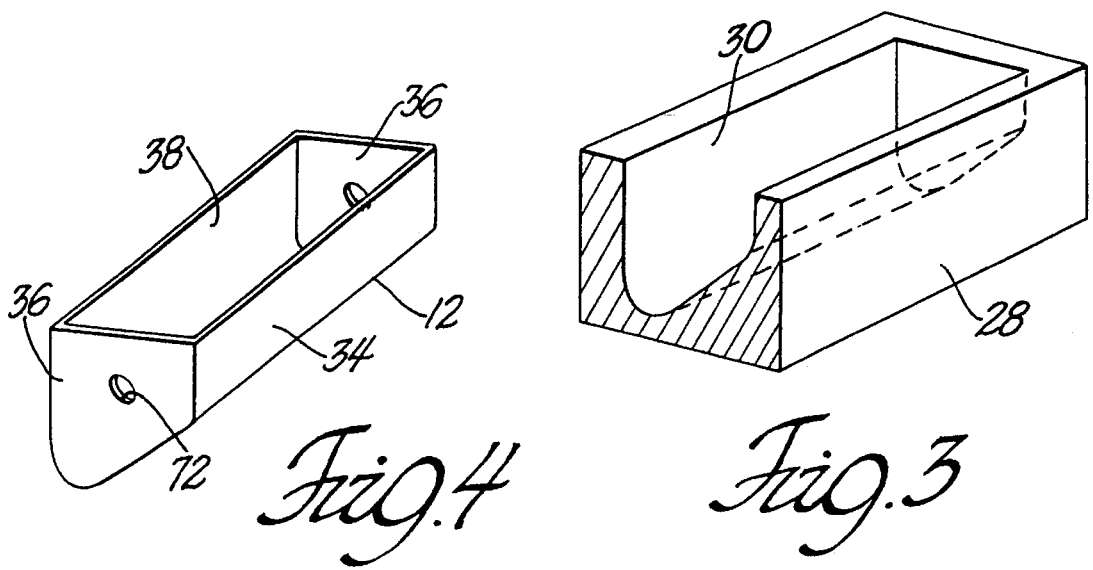

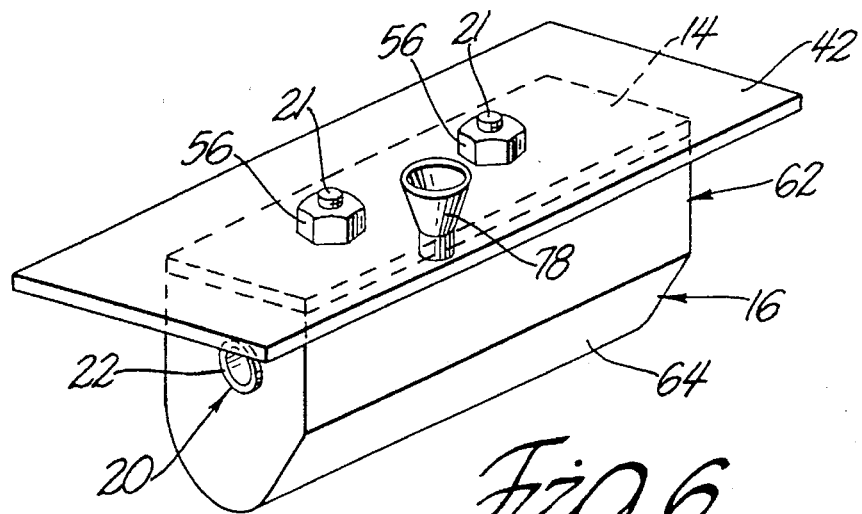
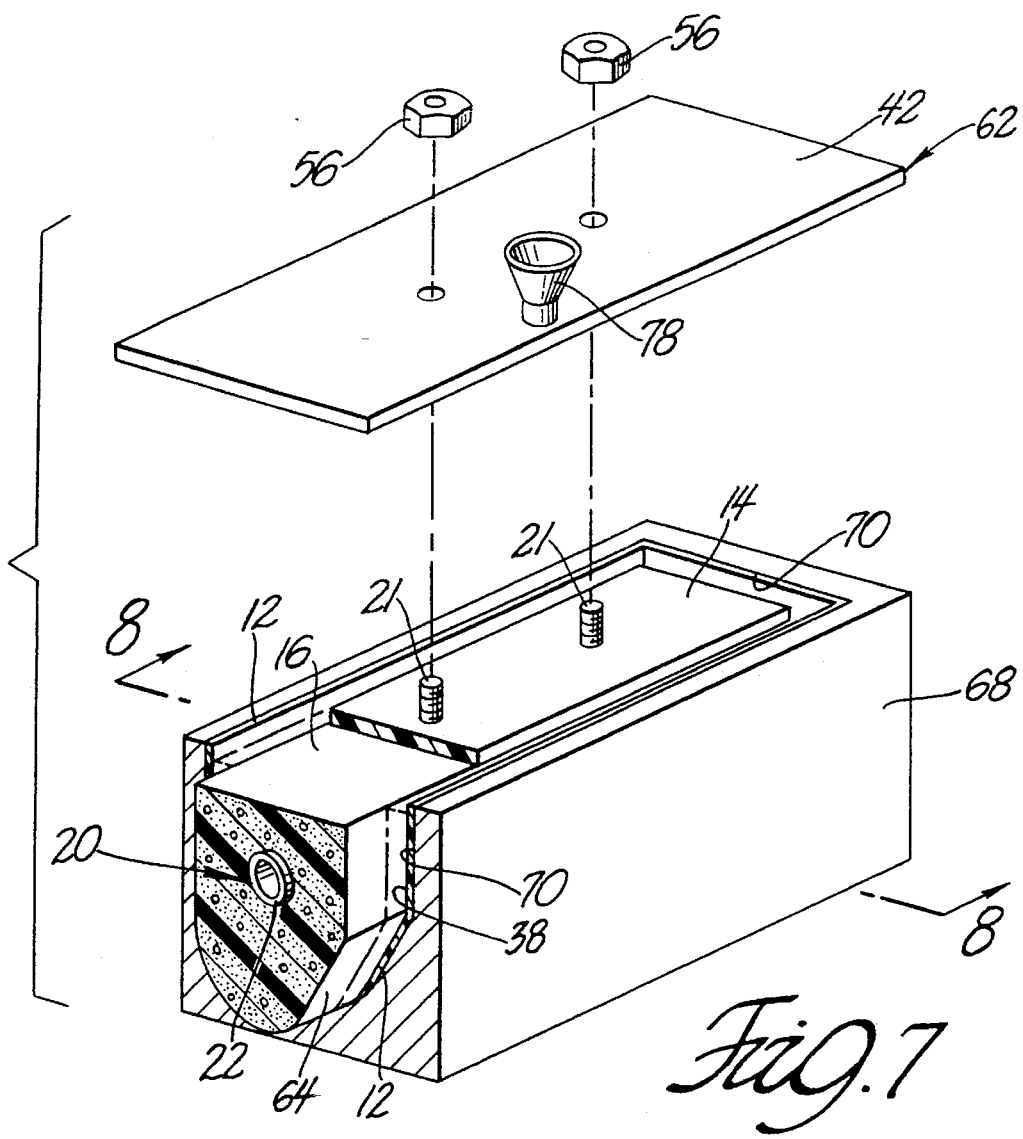

PANEL WITH INTEGRAL ENERGY ABSORBER AND AIR DUCT

This application is a continuation of application Ser. No. 08/424,183 filed Apr. 19, 1995, now abandoned.

TECHNICAL FIELD

This invention relates to interior panels with an energy absorbing material and an air duct therebehind for use in motor vehicles and the like.

BACKGROUND OF THE INVENTION

Interior panels such as the instrument panel in a motor vehicle typically have a cast vinyl skin or sheet stock vinyl skin material backed by a semirigid polyurethane foam that is adhered to a rigid plastic retainer or insert that attaches to the vehicle structure. Rigid plastic HVAC (heating, ventilating, and air conditioning) ductwork and various assembly components such as a glove box door and HVAC vents are then added separately in post-production assembly lines. Where energy absorption is desired in the panel for passenger protection, energy absorbing foams of the expanded bead type are generally used behind the skin. There is also a desire to incorporate the plastic ductwork in some of the panels for space and cost saving reasons. The foams that are commonly used for energy absorption result from the processing of beads of expandable styrenic polymer materials. But this processing does not normally permit such ductwork to be integrally molded in place in the foam with the foam molded in a consistent or uniform surrounding manner nor can such foam be molded against the plastic skin or the plastic ductwork or the plastic insert and successfully adhere directly thereto during the foam molding process. As a result, where such expanded bead foam materials are used for energy absorption, the foam is made separately from the panel and then adhesively bonded to the skin, ductwork, and/or the insert resulting in additional tooling, material, processing steps, and cost.

Moreover, whatever foam material is used for energy absorption and where the ductwork is to be molded in the foam, the foam must somehow be prevented from entering the ductwork during the foaming process. This poses a problem of cost effectively preventing this either with tools and/or in the manner of molding with the ductwork in place. There is also the additional problem of ensuring the dimensional stability of the finished panel where expandable styrenic polymer materials are used.

SUMMARY OF THE INVENTION

The present invention is an improvement over conventional panel constructions wherein the ductwork is not added separately but is integrated into the panel with reaction injection molded energy absorbing rigid polyurethane foam in a manner that reduces assembly time, reduces squeaking and rattling of the ductwork, and also improves the integrity of the panel and without requiring any secondary adhesion operation by virtue of the inherent adhering characteristics of the polyurethane foam in its formation. Moreover, the polyurethane foam is used in two forms; namely, as an energy absorbing rigid foam core for efficient energy absorption and in a semirigid form in a layer between the energy absorbing foam core and the skin when the latter is of the soft and flexible type. The semirigid layer imparts a desirable soft feel to the flexible skin as well as protects the energy absorbing foam against indentation during normal use. The semirigid polyurethane foam layer and the energy absorbing rigid polyurethane foam core adhere to each other, whether or not either has a surface containing external mold release for its processing thus further reducing the need for secondary operation.

In one preferred form, the panel comprises a soft thermoplastic skin, both semirigid and energy absorbing rigid polyurethane foam, a rigid thermoplastic retainer, and a rigid thermoplastic air duct molded in place in the energy absorbing foam. The making of the panel in this form is accomplished with one skin mold for the skin or panel shell and only one and one-half pour molds for the two different polyurethane foams. The skin mold is adapted to form the skin according to conventional practice in a casting process using thermoplastic powder and with or without a crenulated surface on its backside for mechanical bonding with the polyurethane foam substrate.

The reaction injection molding polyurethane foam molds comprise a lid and a first pour mold cavity and an air duct support arrangement wherein the mold cavity and the air duct support arrangement cooperatively define a molding space conforming in shape to the skin mold cavity but smaller in size by the desired thickness of the semirigid foam layer. The air duct support arrangement is adapted to support a preformed air duct in the mold cavity while also blocking the interior of the air duct from the mold cavity. The lid is adapted to hold a preformed retainer in the desired relationship with the air duct and close the mold cavity. The mold cavity is adapted to receive a liquid polyurethane foam producing mixture to form an energy absorbing rigid polyurethane foam core surrounding the air duct and extending between the latter and the panel retainer to integrally join same. A second pour mold cavity has a shape conforming to but slightly larger than the skin mold cavity so as to be adapted to readily receive the skin against its surface. The one lid is adapted to support the integrally joined retainer and energy absorbing rigid polyurethane foam core with the air duct molded therein in the second pour mold cavity with the energy absorbing foam core spaced from the backside of the skin a uniform distance equal to the desired thickness of the semirigid foam layer. The space in the second pour mold cavity between the skin and the energy absorbing foam core is adapted to receive a second liquid polyurethane foam producing mixture to form a semirigid foam layer therebetween to integrally join same and complete the formation of the panel.

The skin may also be backed directly with the energy absorbing foam core whether the skin is hard or soft. In that case only the larger pour mold cavity and the lid are used wherein the air duct is then supported by the skin in this cavity while the lid again supports the retainer and the liquid energy absorbing foam molding mixture is poured into the space surrounding the air duct and between the skin and the retainer.

It is therefore an object of the present invention to provide a new and improved panel having an energy absorbing rigid polyurethane foam core with a molded in air duct extending therethrough.

Another object is to provide a new and improved interior panel for a motor vehicle and the like having an energy absorbing rigid polyurethane foam core molded about an air duct and to a thermoplastic skin and retainer.

Another object is to provide a panel having energy absorbing rigid polyurethane foam core molded about an air duct and to a thermoplastic skin and retainer and wherein no separate adhesive is required to bond the panel components together.

Another object is to provide a panel having a thermoplastic skin and an energy absorbing rigid polyurethane foam core molded about an air duct and to the skin and a thermoplastic retainer and wherein no separate adhesive is required to bond the panel components together and wherein the panel is formed with minimum tooling and processing steps.

Another object is to provide a panel having a thermoplastic skin, a thermoplastic retainer, an energy absorbing rigid polyurethane foam core molded about an air duct and to the retainer, and a semirigid polyurethane foam layer molded between and to the foam core and the skin and wherein no separate adhesive is required to bond the panel components together and wherein the panel is formed with minimum tooling and processing steps.

Another object is to provide a panel having a thermoplastic skin that may be hard or soft, an air duct, a thermoplastic retainer, and an energy absorbing rigid polyurethane foam core molded about and directly to the air duct and also molded directly to both the retainer and the skin and wherein no separate adhesive is required to bond the panel components together and wherein the panel is formed with minimum tooling and processing steps.

Another object is to provide a panel having a soft thermoplastic skin, a thermoplastic retainer, a plastic air duct, an energy absorbing rigid polyurethane foam core molded about the air duct and to the retainer, and a semirigid polyurethane foam layer molded between the energy absorbing foam core wherein the panel is formed without requiring any separate adhesive to bond the panel components together and with the use of minimum tooling and processing steps.

Another object is to provide tooling and a method for molding a panel with an integral thermoplastic skin, both semirigid and rigid polyurethane foam, a thermoplastic retainer, and an air duct wherein the tooling essentially comprises a shell mold for molding the skin and one and one-half pour molds for molding an energy absorbing rigid polyurethane foam core about the air duct and to the retainer and a semirigid polyurethane foam layer between the skin and the energy absorbing foam core.

Another object is to provide tooling and a method for molding a panel with an integral thermoplastic skin, a thermoplastic retainer, and an energy absorbing rigid polyurethane foam core molded about the air duct molded and to both the skin and the retainer.

Another object is to provide two pour mold cavities using a common lid to mold an energy absorbing rigid polyurethane foam core about an air duct and to a thermoplastic retainer and to mold semirigid polyurethane foam between a thermoplastic skin and the energy absorbing foam core to form an integral panel assembly to serve as an interior energy absorbing and air conducting panel in the passenger compartment of a motor vehicle and the like.

These and other objects, features, and advantages of the present invention will become more apparent from the following description and accompanying drawings wherein:

BRIEF DESCRIPTION OF THE DRAWINGS

FIG. 1 is a partially sectioned view of a panel constructed in accordance with the present invention;

FIG. 2 is a schematic view of the powder box and cavity mold used to form the vinyl skin for the panel in FIG. 1;

FIG. 3 is a view of the cavity mold in FIG. 2 taken along the line 3—3 in FIG. 2 when looking in the direction of the arrows;

FIG. 4 is a view of the skin as molded in the mold in FIG. 2;

FIG. 6 is a view of the energy absorbing foam molded about the air duct and to the panel retainer in the pour mold in FIG. 5;

FIG. 7 is a schematic view with parts exploded and parts broken away of the pour mold used to mold semirigid foam to the energy absorbing foam with integral air duct and panel retainer in FIG. 6;

DETAILED DESCRIPTION OF THE DRAWINGS

Figure 5:
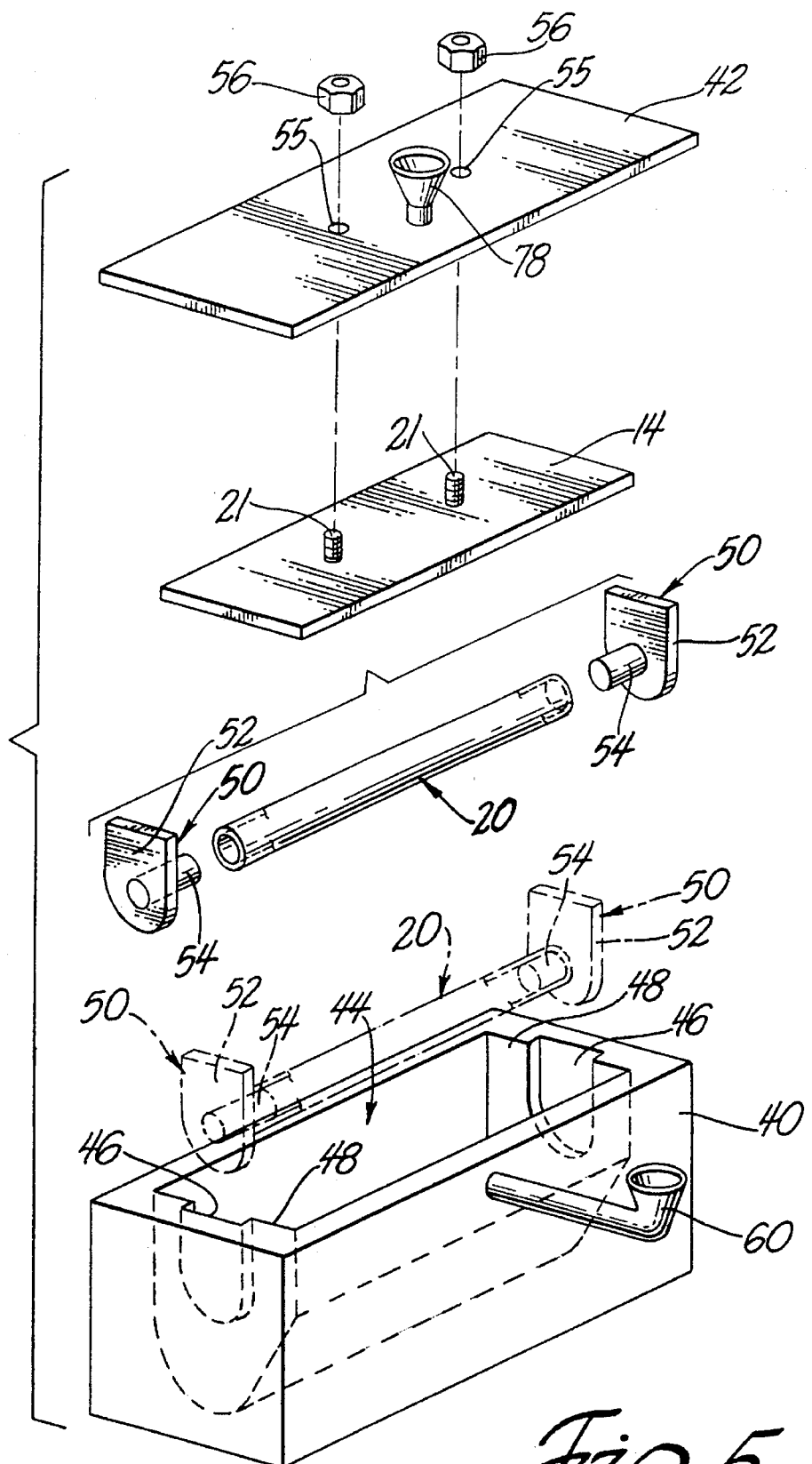
FIG. 5 is an exploded schematic view of the pour mold used to mold the energy absorbing foam about the air duct and panel retainer in the panel construction in FIG. 1.

There is illustrated in FIG. 1 an interior panel 10 for the passenger compartment of a motor vehicle and the like comprising a thin, thermoplastic skin 12 that may be either hard or soft and flexible; a thin, rigid, thermoplastic retainer or insert 14; a thick, centrally located, energy absorbing rigid polyurethane foam core 16 comprising a major percentage of the volume of the panel; a thin, semirigid polyurethane foam layer 18; and a thin wall, rigid, thermoplastic air duct 20 molded in place with the energy absorbing foam core 16. The particular panel illustrated is a knee bolster for one side of the lower half of an instrument panel arrangement but it will be understood that the invention is also applicable to other interior panels in the vehicle such as door and side panels and other interior panels where both air ducting and energy absorption can be used behind the panel skin to advantage. With reference to the term thin as it relates to the skin and semirigid foam layer in the knee bolster illustrated, the skin has a thickness of about one (1) millimeter and the semirigid foam layer has a thickness of about six (6) millimeters whereas the energy absorbing foam has many times the volume of the semirigid foam layer and fills most of the space between the skin and the retainer.

The energy absorbing foam core 16 and the foam layer 18 are both a RIM (Reaction Injection Molded) polyurethane foam comprising polyol, isocyanate, crosslinking agents, other components such as catalysts and surfactants, and a suitable blowing agent. The energy absorbing foam is a rigid foam of relatively low density (for example, 2.5–5.5 pounds per cubic foot) having a flat, square wave force/deflection energy management characteristic that provides very efficient impact energy absorption. Examples of such energy absorbing foam are disclosed in U.S. Pat. No. 5,232,957 which is hereby incorporated by reference and to which reference is made for further details thereof. The foam layer 18 is a conventional semirigid polyurethane foam of medium density (for example, 6–9 pounds per cubic foot) having a sloped force/deflection curve whose function is to protect the integrity of the energy absorbing core during normal use and impart a soft feel to the skin when it is of the soft and flexible type. The semirigid polyurethane foam layer protects the energy absorbing foam from damage such as finger indentation through the flexible skin during normal use and yields to panel impact to allow the energy absorbing foam to absorb the impact energy with its superior energy absorbing property.

The panel retainer 14 and air duct 20 are preformed in the shapes illustrated prior to the molding of the panel 10 and are made of a thermoplastic material such as PVC (polyvinyl chloride) by injection molding or other suitable manufacturing process and with the retainer having threaded fasteners 21 insert molded therewith as shown or otherwise bonded thereto to provide for securing the panel to the vehicle structure. It will also be understood that the retainer could be formed of sheet metal with the fasteners fixed thereto by welding. The interior panel 10 in its function as a lower instrument panel or knee bolster is adapted to face the front seat in the vehicle at the knee level of a passenger and the air duct 20 extends longitudinally thereof and is adapted to be sealingly connected at its two opposite ends 22 in and as part of the ductwork serving the air needs of the passenger compartment. In such capacity, one of the air duct ends 22 serves as an entrance for the treated air into the panel while the other end serves as an exit for passage of the treated air from the panel. The air duct is illustrated as a straight one-piece round pipe or tube but it will be understood that it may take various forms and shapes including comprising several separate and/or interconnected pipes or branches and of various cross section.

The molds for constructing the panel 10 include a thermoplastic casting mold 24 illustrated in FIGS. 2 and 3 for casting the thermoplastic skin or shell 12 in either a hard or soft form using conventional cast molding apparatus and practice. The skin mold comprises a powder box 26 that is adapted to sealing clamp by suitable conventional means (not shown) to a heatable casting mold 28. The mold has a cavity 30 whose surface corresponds to the outer surface of the skin and is typically formed by electroplating nickel on a master mold that is the reverse of the shape of the exterior side of the panel. The skin is made of a suitable thermoplastic material such as polyvinyl chloride that is processed from a powder form of the material having a resin core with a suitable plasticizer and an outer surface impregnated with pigments for giving the skin the desired color. The skin is formed by loading a quantity of the plastisol powder into the box 26 while it is separated from the mold and both are inverted and the mold is heated. The inverted powder box and mold are then joined and uprighted causing the powder to be cast onto the heated surface of the mold cavity 30 where it fuses during a casting process to form the skin. The powder box and the mold are then inverted again and separated, the fused skin 12 is cooled and removed and is illustrated in FIG. 4 as it comes from the mold.

As formed, the skin 12 has a convex curved side 34 having an outer appearance surface facing the interior of the vehicle and two flat ends 36 transverse to the curved side 34. The panel ends 36 are adapted to abut with other interior panels or structure of the vehicle (not shown) and are thus hidden from view in the passenger compartment. The skin is of substantially uniform wall thickness with a backside or inner surface and eventual interface 38 behind or interior of the curved side 34 and flat ends 36. And while the skin is illustrated as being cast, it will be understood that the skin 12 could also be molded from sheet stock vinyl material or other thermoplastic material using a similar female cavity and a counterpart male mold or the skin could be spray molded using only the female cavity and again using conventional apparatus and practice associated with these different molding and forming processes.

The reaction injection mold assembly for molding the energy absorbing foam core 16 comprises a pour mold 40 and a lid 42 as illustrated in FIG. 5. The mold 40 has a cavity 44 corresponding in shape to the interior side or interface 38 of the vinyl skin 12 but is smaller in size by the thickness of the semirigid foam layer 18. The cavity 44 may also be described as corresponding in shape to the skin mold cavity 30 but smaller in size by the combined thickness of the skin and the semirigid foam layer 18. A vertical recess or slot 46 is formed in each end 48 of the mold cavity 44 to slidably receive a removable air duct support 50 in a mounting arrangement wherein one side 52 of the supports is flush with the mold cavity 44 at its opposite ends 48. The supports 50 each have a mandrel 54 that is adapted to closely receive one end 22 of the air duct to support the air duct 20 in the mold cavity 44 in the desired final panel relationship. The air duct 20 and supports 50 are shown in exploded relationship in solid line in FIG. 5. The air duct 20 is installed in the mold cavity 44 by mounting the duct on the mandrels 54 as shown in phantom line FIG. 5 and then sliding the supports 50 into the respective slots 46. The sides 52 of the supports 50 form a planar continuation of the ends 48 of the cavity 44 to the exterior of the air duct where it enters same and seal off the interior of the air duct from the cavity for the molding of the foam. In the particular panel construction illustrated, the air duct is located longitudinally of and in a generally central position in the mold cavity 44.

The preformed retainer 14 for the panel 10 is temporarily secured to the underside of the mold lid 42 by its normal threaded fasteners 21 which are received through holes 55 in the lid and held by nuts 56. The lid 42 with the retainer 14 attached is clamped by suitable conventional means (not shown) to the pour mold 40 to close and seal the mold cavity 44. With the air duct 20 and retainer 14 thus supported in the mold cavity 44, liquid energy absorbing rigid polyurethane foam mixture as disclosed in the above U.S. Pat. No. 5,232,957 and of either a recoverable or friable type is poured into the mold cavity 44 through one or more sprues 60. The mixture reacts in the mold cavity 44 to produce the energy absorbing rigid polyurethane foam core 16 that completely fills the cavity and surrounds the air duct 20 and the space between the air duct and the retainer 14 and adheres directly to both in the foaming process resulting in their integral joining. The lid 42 is then removed and pulls with it the retainer 14 and thereby the duct supports 50, the air duct 20, and the molded energy absorbing foam core 16. The supports 50 are then removed from the air duct ends 22 resulting in the processing assembly 62 including the lid 42 illustrated in FIG. 6 wherein the air duct ends 22 protrude very slightly from the molded energy absorbing foam core 16 and the latter is masked or covered by only the retainer 14 leaving only its eventual interface 64 with the semirigid foam layer 18.

The reaction injection mold assembly for molding the semirigid foam 18 in a second and last foam molding step comprises the processing assembly 62 as illustrated in FIG. 6 and a second pour mold 68 as illustrated in FIG. 7. The mold 68 has a cavity 70 corresponding to that of the cavity 30 for the skin mold 28 but is slightly larger for readily receiving the skin 12 against its surface. The one lid 42 also fits the top of the mold 68 and is now used to support the integrally joined air duct 20 and energy absorbing foam core 16 and retainer 14 in the mold cavity 70 with the exposed surface 64 of the energy absorbing foam core spaced from the backside or interface 38 of the skin a distance equal to the desired thickness of the semirigid foam layer as illustrated in FIG. 8.

Figure 10:
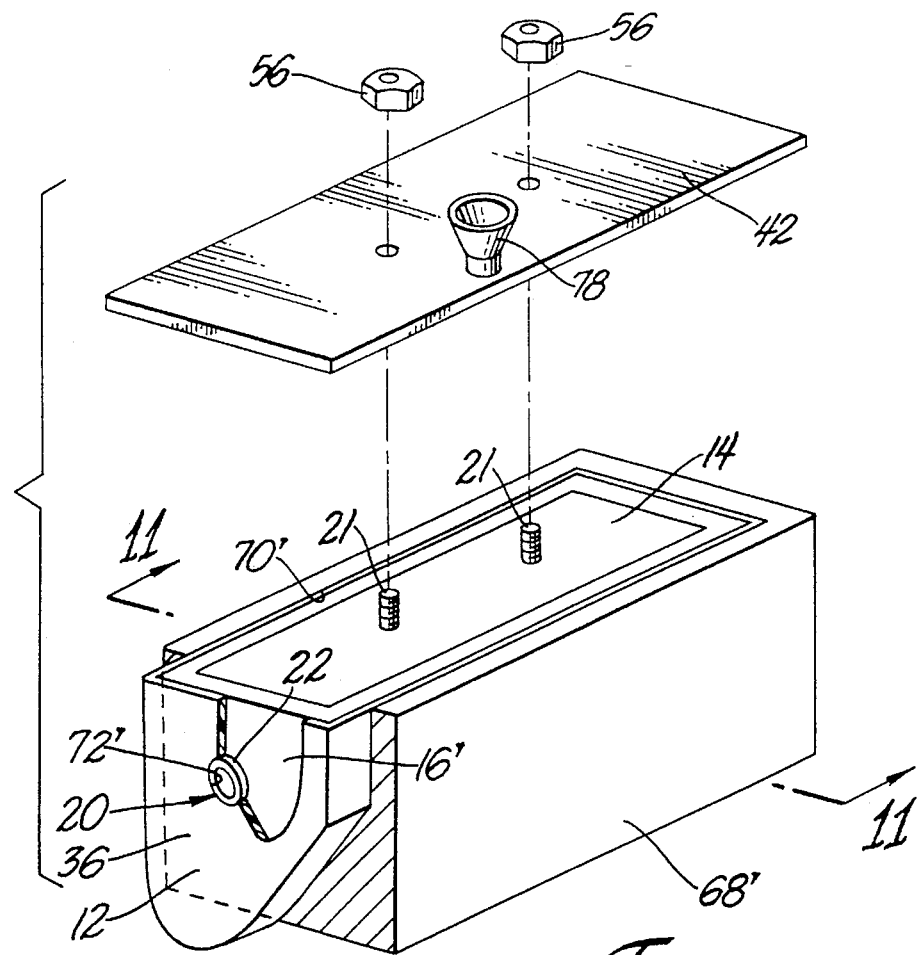
FIG. 10 is a schematic view with parts exploded and parts broken away illustrating the apparatus used to form the energy absorbing foam core about the air duct and directly to the skin and the retainer and also illustrating the panel thus formed.

The projecting air duct ends 22 may be sized in length to the thickness of the semirigid polyurethane foam layer 18 to closely fit within the skin between its ends 36 and with holes 72 then later formed in the ends 36 of the skin to expose the ends of the air duct. The air duct ends 22 may also be temporarily blocked by a suitable masking material such as plastics tape to block entry of foam during this second and last foaming process. Or larger holes 72' the size of the outer diameter of the duct may be formed in the skin 12 prior to molding the semirigid foam layer as illustrated in FIG. 10 in which case they are then used to receive and support the air duct and the skin becomes a part of the processing assembly 62. In the latter case, the skin 12 is mounted on the ends 22 of the air duct with the ends flush with the exterior of the hidden sides 36 of the skin. The skin 12 as a part of the processing assembly 62 is received therewith in the mold cavity 70 and with the ends of the air duct by their close fit in the skin holes 72' effectively serving to block entry of foam into the ends of the air duct in the second and last foaming process without any additional foam blocking support, although the mandrel support can still be used in this final foaming operation.

In either case, with the skin part of the processing assembly 62 supported on the ends of the air duct or separately inserted in the mold cavity 70, the lid 42 is clamped to the pour mold 68 by suitable conventional means (not shown) to close and seal the mold cavity 70 wherein there is resultantly formed an energy foam molding cavity or space 74 of the desired shape for the semirigid foam between the interface 38 of the skin and the previously molded interface 64 of the energy absorbing foam structure 16.

Figure 8:
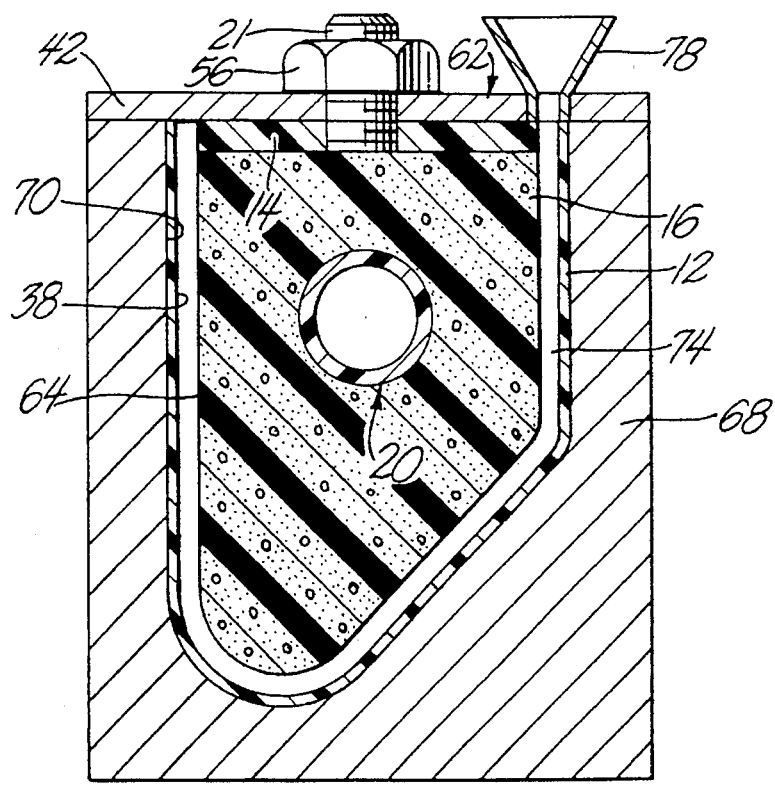
FIG. 8 is an enlarged view taken along the line 8—8 in FIG. 7 when looking in the direction of arrows.
Figure 9:
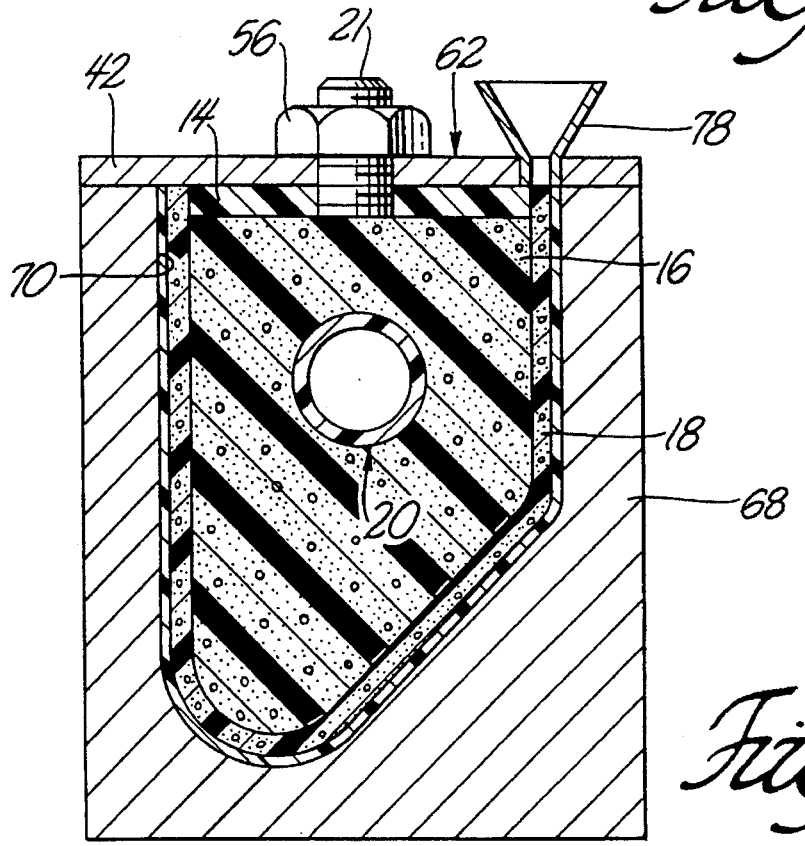
FIG. 9 is a view like FIG. 8 but showing the molding of the semirigid foam.

With the retainer 14, energy absorbing foam core 16, and air duct 20 thus supported in the mold cavity 70, liquid isocyanate and polyol with suitable other foam forming components are mixed in the proper proportions to form medium density semirigid polyurethane foam and this mixture is poured into the foam mold cavity 74 through one or more sprues 78 connect to the cavity in the space between an edge of the retainer 14 and an edge of the pour mold cavity 70 as illustrated in FIGS. 8 and 9. Then as illustrated in FIG. 9, the mixture reacts in the foam mold cavity 74 to produce the semirigid polyurethane foam layer 18 that fills the space between the energy absorbing foam core 16 and the skin 12 and adheres to both resulting in their integral joining and with it the integral joining of the skin and the semirigid foam layer to the retainer through the medium of the energy absorbing foam core. The lid 42 is then removed and pulls with it the completed panel 10 which then can be removed from the lid.

Figure 11:
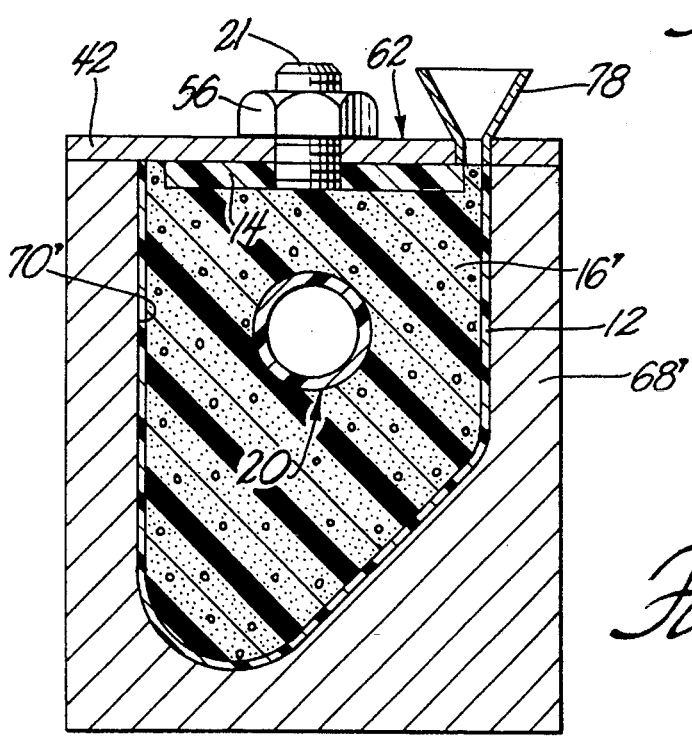
FIG. 11 is an enlarged view taken along the line 11—11 in FIG. 10 when looking in the direction of the arrows.

The panel may also be made without the semirigid foam layer whether the skin is hard or soft and flexible. This is accomplished with a pour mold 68' with a larger cavity 70' and again the lid 42 to form a pour mold for the energy absorbing foam as illustrated in FIGS. 10 and 11. In this case, the skin 12 is provided with the larger holes 72' after its formation and the air duct 20 is tightly inserted over the mandrel 54 and placed with the skin in the mold cavity 70'. The skin 12 thus acts to support the air duct 20 in place for the molding of the energy absorbing foam with the additional special mold insert supports and while the air ducts prevent the escape of the liquid foam producing mixture from the interior of the skin to the surface of the mold cavity 70'. The retainer 14 is temporarily secured to the underside of the lid 42 as before and mounted on top of the mold 68 over the skin and the air duct to close the cavity 70'. The liquid energy absorbing foam mixture is then poured into the mold through the sprue 78 to fill the space between the skin, air duct, and retainer and form a larger energy absorbing foam core 16' about the air duct that directly adheres to the skin and the retainer as well as the air duct without requiring any separate adhesive to bond these panel components together.

The invention has been described in an illustrative manner, and it is to be understood that the terminology that has been used is intended to be in the nature of words of description rather than of limitation. Obviously, many modifications and variations of the present invention in light of the above teachings may be made. It is therefore to be understood that, within the scope of the appended claims, the invention may be practiced otherwise than as specifically described.

What is claimed is:

1. An interior energy absorbing panel for an air-treated vehicle passenger compartment comprising a thermoplastic skin, a thermoplastic retainer, a thermoplastic air duct, and an energy absorbing rigid polyurethane foam core having a square wave energy management characteristic; said core extending about and self-bonded directly to said air duct and also self-bonded directly to said retainer and bonded at least indirectly to said skin.

2. An interior energy absorbing panel as defined in claim 1 wherein said skin is formed of a hard thermoplastic material and said energy absorbing rigid polyurethane foam core is directly self-bonded to said skin.

3. An interior energy absorbing panel as defined in claim 1 wherein said skin is formed of a flexible thermoplastic material and said energy absorbing rigid polyurethane foam core is indirectly bonded to said skin by an intermediate layer of semirigid polyurethane foam that is self bonded to said foam core and said skin and imparts a soft feel to said skin.

4. An interior energy absorbing panel as defined in claim 1 wherein said air duct has at least one open end that is received in an opening in a hidden side of said skin and is supported by said skin at said opening.

5. An interior energy absorbing panel as defined in claim 1 wherein said air duct has an open entrance end and an open exit end received in openings in hidden sides of said skin and is supported by said skin at said openings.

* * * * *